A. H. RAINFTLEN.
FASTENING MEANS.
APPLICATION FILED MAY 1, 1918.
1,281,834.
Patented Oct. 15, 1918.
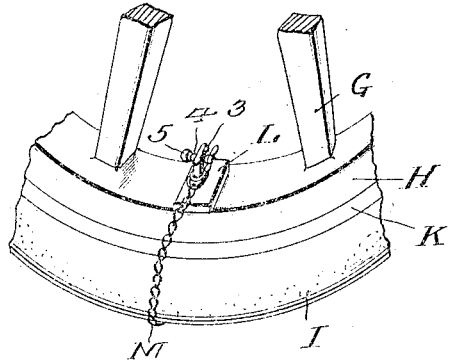
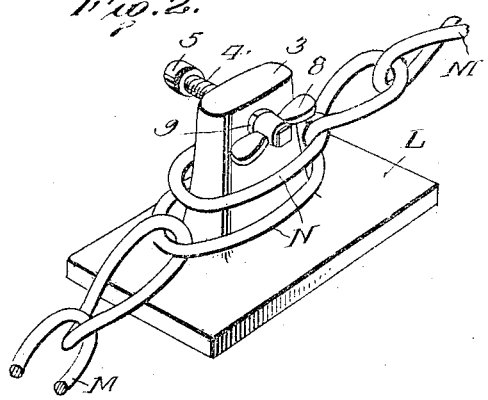
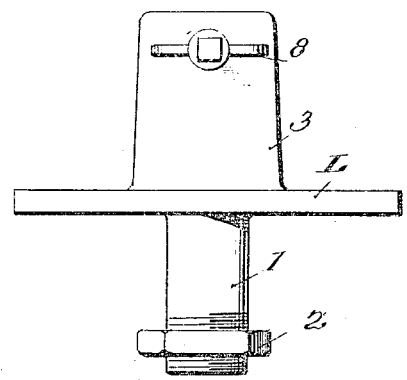
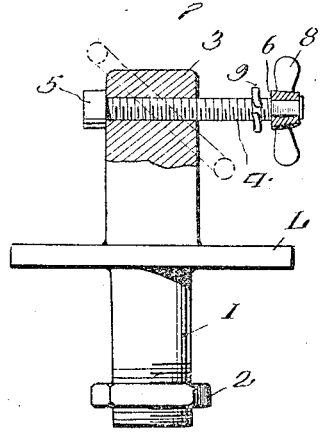
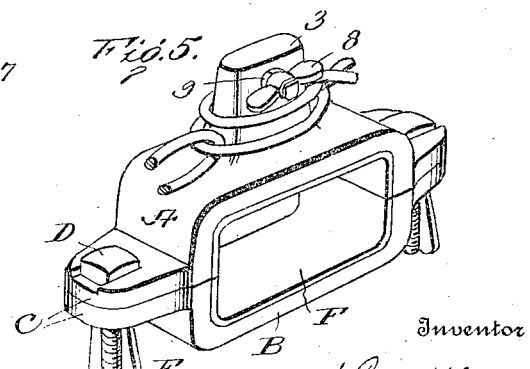
Inventor
August H. Rainftlen
By Wm. H. Babcock & Son
Attorneys

UNITED STATES PATENT OFFICE.

AUGUST H. RAINFTLEN, OF PLANTSVILLE, CONNECTICUT, ASSIGNOR, BY MESNE ASSIGNMENTS, TO THE STEEL PRODUCTS COMPANY, OF PLANTSVILLE, CONNECTICUT, A CORPORATION OF CONNECTICUT.

FASTENING MEANS.

1,281,834.  Specification of Letters Patent.  Patented Oct. 15, 1918.

Application filed May 1, 1918.  Serial No. 231,820.

*To all whom it may concern:*

Be it known that I, AUGUST H. RAINFT-LEN, a subject of the Emperor of Germany, (having taken out my first papers on the 6th day of April, 1917, in the process of becoming a naturalized citizen of the United States,) residing at Plantsville, in the county of Hartford and State of Connecticut, have invented certain new and useful Improvements in Fastening Means, of which the following is a specification.

This invention relates to fastening means or plates, and resides especially in the means for readily securing thereto or thereon the links of a chain or part or parts of some element or elements, and in means for preventing the escape of said links or other parts or part therefrom.

The invention is primarily intended by applicant for use in attaching anti-skidding chains or other devices, of the anchored type, to the spokes or felly of an automobile truck wheel. However, the invention may be used for a great variety of purposes.

The object of the present invention is to provide a stud, which may be integral with a plate, as shown, and at an angle to the face thereof, said stud being adapted to receive the terminal links of such a chain or a part or parts of some element or elements, and being provided with movable means to permit the application or removal of such links or part or parts, but normally guarding said stud against the escape therefrom of said links or part or parts.

Other objects are to so form the stud and guard or pin that, after assembly, they cannot be separated except by hard work with a file or chisel or similar tools, thus forming a self-contained unit, no part of which can, in use, become separated and lost.

In the accompanying drawings:

Figure 1 represents a perspective view of a segment of a wheel with a felly plate embodying my invention applied thereto;

Fig. 2, a perspective view of the felly plate with the ends of a chain, broken away, fastened thereto;

Fig. 3, a rear elevation of said plate;

Fig. 4, a side elevation of said plate, partly in section, with a link indicated in dotted lines in position of application or removal; and Fig. 5, a perspective view of a modified form in which a spoke clamp is substituted for the felly plate.

Referring now in detail to the drawings, I indicates the solid tire, K the rim, H the felly and G the spokes of the wheel.

The felly plate L is mounted on the inner peripheral face of the felly by means of a bolt 1, which may be formed integral with said plate, extending radially through said felly and receiving on its externally screw-threaded end a nut 2, which, on being tightened, holds the plate securely in place. The axial line of this bolt 1 will preferably correspond to the axial line of the stud 3 projecting from the other side of the plate.

This stud 3 is provided with a transverse internally screw-threaded hole which receives the externally screw-threaded stem of the bolt or pin 4, which serves as a guard for said stud, and which is provided at one end with an enlarged shoulder 5, which may be formed integral with said pin and is too large to pass through the hole in stud 3, as shown best in Fig. 4.

The other end is shouldered at 6 and provided with an angular extension 7, which receives the thumb-piece 8 for convenience in operation and also to provide this end with an enlargement which cannot pass through said hole. A split lock washer 9 is, preferably, mounted on said pin between the piece 8 and the adjacent wall of said stud 3, to engage said wall and the adjacent face of said thumb-piece when the parts are in normal position and thus prevent movement of said pin 4 by vibration and the like.

To assemble, the pin 4 is screwed into the hole in stud 3, angular extension 7 first, until the shoulder 5 engages the side of stud 3 and the extension 7 protrudes beyond the other side thereof. The lock-washer 9 is then passed over said extension 7 and onto the threaded part of the pin or guard 4 and the thumb-piece 8, having a hole corresponding in shape and size to the extension 7, is slipped over said extension, the end of which is then upset or riveted over, as shown in Fig. 4, preventing the separation of the above mentioned parts.

In operation, to apply a link, the guard 4 is screwed out until it takes the position shown in Fig. 4, the link is slipped over the thumb-piece 8, along the guard or pin 4 until it engages the side of the stud 3, when said link is to be turned at an angle and passed over the top of said stud 3 and the shoulder 5, as indicated in dotted lines in Fig. 4. The pin or guard 4 is then to be screwed in through stud 3 until further movement is prevented by the lock-washer engaging the opposing faces of the stud 3 and piece 8, its normal position.

This piece 8 is provided with wings or arms which are of such size and project at such an angle to the stud 3 that the said links cannot be slipped over them by turning said links into a position at right angles to the dotted line position illustrated in Fig. 4, in fact piece 8 will prevent said links from assuming such a position, and the pin 4 extending on the other side of the stud 3 will prevent said links from assuming the position illustrated in dotted lines in Fig. 4 so long as said pin or guard 4 is in normal position. Thus said links will be guarded against escape from said lug 3 when said pin or guard 4 is in normal position, and in practically all other positions of the pin except that illustrated in Fig. 4.

In the modification shown in Fig. 5, a spoke clamp, comprising plates A and B provided with perforated end flanges C for the reception of bolts D on which nuts E are screwed to draw the plates together on some intervening object and provided with a rubber treated textile fabric lining or a rubber lining F, is utilized in place of the felly plate L of the preferred form, the stud 3 being mounted on the plate A of the modified form. Otherwise, the two forms are alike in all respects.

In the use primarily intended the cross-chain M will have its terminal links N untwisted to facilitate the application or removal to or from said stud of said terminal links.

Having thus described my invention what I claim as new and desire to secure by Letters Patent is:

1. A stud adapted to receive detachably an element, in combination with means movable transversely through said stud, said means being so formed as to be inseparable from said stud and adapted, in normal position, to guard said stud against the escape therefrom of an endless article, said means being movable into a position allowing the application to, or removal from, said stud of said element.

2. A plate and a stud fixedly located on said plate, in combination with means movable transversely of said stud and having screw-thread engagement with said plate, said means being so formed as to be inseparable from said plate and adapted, in normal position, to guard said stud against the escape therefrom of an element.

3. A plate and a stud fixedly located on said plate, in combination with means movable transversely of said stud and having screw-thread engagement therewith and having its portions on opposite sides of said stud provided with enlarged permanent parts which, because of their size, cannot pass through said studs, said means, in normal position, serving to guard said stud against the escape therefrom of an element.

4. A plate and a stud fixedly located on said plate, in combination with a screw-threaded guard movable transversely through said stud, having a shoulder on one end too large to pass through said stud and a thumb-piece on the other end portion on the other side of said stud, which thumb-piece is permanently fixed to said guard and too large to pass through said stud, and a lock-washer mounted on said guard between said thumb-piece and the adjacent face of said stud to lock said guard in normal position.

5. A plate adapted to receive a flexible element, in combination with means moving through a part of said plate and in normal position preventing the escape of said flexible element from said plate, said means being provided on both sides of said part with permanently enlarged parts inseparable therefrom preventing the separation of said means from said plate.

6. A plate having a stud fixedly located on one side and an integral anchoring bolt on the other, in combination with means engaging said stud, inseparable therefrom, and in normal position adapted to be engaged by an element connected to said stud to prevent the escape of said element therefrom.

Signed at Plantsville, in the county of Hartford and State of Connecticut, this 29th day of April, 1918.

AUGUST H. RAINFTLEN.

Copies of this patent may be obtained for five cents each, by addressing the "Commissioner of Patents, Washington, D. C."